United States Patent
Santillán Gutierrez et al.

(10) Patent No.: US 9,834,117 B2
(45) Date of Patent: Dec. 5, 2017

(54) RELEASE MECHANISM FOR A RECLINING VEHICLE SEAT

(71) Applicant: FORD GLOBAL TECHNOLOGIES, LLC, Dearborn, MI (US)

(72) Inventors: Diego Santillán Gutierrez, Tizayuca (MX); Fernando Paisano Rodriguez, San Andres Cholula (MX)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 14/876,017

(22) Filed: Oct. 6, 2015

(65) Prior Publication Data

US 2017/0096087 A1  Apr. 6, 2017

(51) Int. Cl.
  *B60N 2/22*  (2006.01)
  *B60N 2/20*  (2006.01)

(52) U.S. Cl.
  CPC ............ *B60N 2/2213* (2013.01); *B60N 2/20* (2013.01); *B60N 2/2227* (2013.01)

(58) Field of Classification Search
  None
  See application file for complete search history.

(56) References Cited

U.S. PATENT DOCUMENTS

| | | | |
|---|---|---|---|
| 4,060,274 A * | 11/1977 | Bienert | B60J 7/057 296/221 |
| 4,538,856 A * | 9/1985 | Katsumoto | B60N 2/2213 16/333 |
| 4,576,412 A | 3/1986 | Terada | |
| 4,629,251 A | 12/1986 | Tezuka | |
| 4,705,318 A | 11/1987 | Yamada et al. | |
| 4,781,415 A * | 11/1988 | Heesch | B60N 2/2213 297/354.12 |
| 4,795,213 A | 1/1989 | Bell | |
| 4,822,100 A | 4/1989 | Bell | |

(Continued)

FOREIGN PATENT DOCUMENTS

JP  2011031728 A  2/2011

OTHER PUBLICATIONS

English machine translation of JP2011031728.

*Primary Examiner* — David E Allred
(74) *Attorney, Agent, or Firm* — Vichit Chea; King & Schickli, PLLC

(57) ABSTRACT

A release mechanism for a reclining vehicle seat assembly includes an activation mechanism, for example a lever or handle, and a transmission. The transmission is coupled to the activation mechanism via a wire for releasing a seat back of the vehicle seat assembly. The transmission includes a plurality of meshed gears for transmitting a torque created by movement of the activation mechanism from a gear of the plurality of gears attached to the wire to a shaft associated with the seat back. Rotation of the shaft releases the seat back for rotation. A shield partially covers a side of the base and seat back, and covers the transmission and wire. The activation mechanism is uncovered allowing the passenger to activate the release mechanism and is positioned in a readily accessible zone relative a passenger hip point. The position avoids interference with the seat belt and occupies minimal space between the side shield and vehicle side.

16 Claims, 4 Drawing Sheets

(56) References Cited

U.S. PATENT DOCUMENTS

| | | | | |
|---|---|---|---|---|
| 5,231,890 | A * | 8/1993 | Hayasaka | B63H 21/213 |
| | | | | 440/75 |
| 5,295,730 | A | 3/1994 | Rees | |
| 7,320,501 | B2 * | 1/2008 | Keyser | B60N 2/305 |
| | | | | 296/65.09 |
| 7,997,655 | B2 | 8/2011 | Sakai et al. | |
| 8,400,033 | B2 * | 3/2013 | Karaki | B60N 2/0232 |
| | | | | 310/83 |
| 8,434,823 | B2 | 5/2013 | Du et al. | |
| 2013/0169015 | A1 | 7/2013 | Perraut et al. | |
| 2014/0276393 | A1 * | 9/2014 | Park | A61M 25/0014 |
| | | | | 604/95.01 |
| 2014/0276397 | A1 * | 9/2014 | Terwey | A61B 18/1492 |
| | | | | 604/95.04 |
| 2014/0284983 | A1 * | 9/2014 | Yamada | B60N 2/235 |
| | | | | 297/362 |
| 2014/0309625 | A1 * | 10/2014 | Okamoto | A61B 1/0057 |
| | | | | 606/1 |

\* cited by examiner

RELEASE MECHANISM FOR A RECLINING VEHICLE SEAT

TECHNICAL FIELD

This document relates generally to vehicle seats, and more specifically to a release mechanism for a reclining seat.

BACKGROUND

It is well known to have adjustable seats in a vehicle. Some vehicles offer powered front seats which can be adjusted by using a switch or joystick and a set of electric motors. Other vehicles include manually adjustable front seats and some even having adjustable second and third row seats. Most vehicles that have manually adjustable seats utilize an activation mechanism for releasing a seat back for rotational movement about a shaft. The adjustment may include releasing the seat back for rotation to a forward position to allow passengers to exit a second row of a two door vehicle, for example, or to a reclined position between fully reclined and upright for comfort during periods of driving and non-driving.

In each scenario, the activation mechanism is typically positioned between a side shield of the seat and a side of the vehicle. Traditionally, the activation mechanism includes a lever or handle which is grasped by the seat occupant when adjustment is desired. Activation mechanisms can be a direct type wherein the mechanism contacts the shaft directly or a gooseneck type wherein the mechanism is in a forward position along the side shield and is coupled to the shaft via mechanical linkages. Each of these activation mechanisms suffer from certain drawbacks which can be summarized as being difficult to locate and difficult to utilize due primarily to being in direct contact with the shaft. In some instance, such activation mechanisms are positioned such that the mechanisms are covered by the seat belt when the seat occupant is buckled into the seat. This creates a situation where the seat belt precludes adjustment of the seat back until the seat belt is released. Even more, the seat belt can contact the activation mechanism under certain loading conditions and unintentionally release the seat back.

Accordingly, a need exists for an activation mechanism that is both easy to locate and easy to utilize. Such a mechanism would be positioned in an acceptable zone relative an H-point or passenger hip point such that the mechanism is readily accessible. An H-point is a theoretical, relative location of a vehicle seat occupant's hip. More specifically, a pivot point between a torso and upper leg portions of a body as used in vehicle design and regulation. Even more, the position of the mechanism would avoid interference with the seat belt and occupy a minimal amount of space between the seat side shield and the vehicle side (e.g., the B pillar).

SUMMARY OF THE INVENTION

In accordance with the purposes and benefits described herein, a release mechanism for a reclining vehicle seat assembly having a seat base, a seat back, a side shield and a seat back recliner shaft about which the seat back rotates, includes an activation mechanism, and a transmission coupled to the activation mechanism via a wire for rotating the seat back recliner shaft and releasing the seat back.

In another possible embodiment, the wire and the transmission are positioned within the seat assembly.

In still another possible embodiment, the transmission includes a housing, supported by the seat base, through which the seat back recliner shaft extends, and a plurality of gears. In yet another possible embodiment, at least a portion of the seat back recliner shaft includes a plurality of teeth, and the plurality of gears includes a first gear having a central aperture and internal teeth for receiving the seat back recliner shaft and meshing with the plurality of teeth.

In another possible embodiment, the plurality of gears further includes a second gear attached to the wire such that movement of the activation mechanism moves the wire thereby rotating the second gear about a pin extending from the housing and supporting the second gear.

In still yet another possible embodiment, the second gear includes first and second arms extending from a hub, wherein the first arm is attached to the wire adjacent a distal end of the first arm, and the second arm includes a distal end forming an arc having a plurality of teeth on an inner side of the arc.

In yet another possible embodiment, the release mechanism further includes third and fourth gears for transmitting torque created by movement of the activation mechanism from the second gear to the first gear and the seat back recliner shaft.

In one other possible embodiment, the third and fourth gears each have a plurality of teeth, and the plurality of teeth of the third gear mesh with the plurality of teeth of the second gear and the plurality of teeth of the fourth gear, and the plurality of teeth of the fourth gear further mesh with the plurality of teeth of the first gear.

A vehicle incorporating the release mechanism for a reclining vehicle seat assembly described above.

One additional embodiment of a release mechanism for a reclining vehicle seat assembly includes a transmission, and an activation mechanism coupled to the transmission via a wire for releasing a seat back of the vehicle seat assembly, wherein the wire and the transmission are positioned within the seat assembly.

In another possible embodiment, the activation mechanism is a lever and the transmission includes a plurality of meshed gears for transmitting torque created by movement of the lever from a gear of the plurality of gears attached to the wire to a shaft associated with the seat back.

In yet another possible embodiment, the transmission includes a gear having first and second arms extending from a hub, the first arm attached to and moved by the wire and the second arm forming an arc having a plurality of teeth on an inner side of the arc for meshing with the plurality of meshed gears.

In still another possible embodiment, the transmission includes a housing, supported by a seat base of the seat assembly, through which the seat back recliner shaft extends, and a plurality of gears.

In one additional embodiment, a reclining vehicle seat assembly includes a base supported by the vehicle, a seat back connected to the base for rotation about a shaft, a transmission including a plurality of gears for rotating the shaft and releasing the seat back, a side shield attached to the base and covering at least a portion of a side of the base and a side of the seat back, and a lever attached to the transmission via a wire, wherein the transmission and the wire are covered by the side shield.

In another possible embodiment, the plurality of gears are meshed for transmitting torque created by movement of the lever from a gear of the plurality of gears attached to the wire to the shaft.

In yet another possible embodiment, least a portion of the shaft includes a plurality of teeth, and the plurality of gears includes a first gear having internal teeth for meshing with the plurality of teeth, and a second gear attached to the wire such that movement of the lever moves the wire thereby rotating the second gear about a pin extending from a housing and supporting the second gear.

In still another, the second gear includes first and second arms extending from a hub, the first arm attached to the wire and the second arm forming an arc having a plurality of teeth on an inner side of the arc.

In yet still another possible embodiment, the reclining vehicle seat assembly further includes third and fourth gears for transmitting torque created by movement of the lever from the second gear to the first gear and the shaft. In another, the third and fourth gears each have a plurality of teeth, and the plurality of teeth of the third gear mesh with the plurality of teeth of the second gear and the plurality of teeth of the fourth gear, and the plurality of teeth of the fourth gear further mesh with the plurality of teeth of the first gear.

In the following description, there are shown and described several embodiments of a release mechanism for a reclining seat assembly for a vehicle and a vehicle incorporating same. As it should be realized, the invention is capable of other, different embodiments and its several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the release mechanism for a reclining seat assembly for a vehicle and together with the description serve to explain certain principles thereof. In the drawing figures.

Reference will now be made in detail to the present preferred embodiments of the release mechanism for a reclining seat assembly for a vehicle, examples of which are illustrated in the accompanying drawing figures, wherein like numerals are used to represent like elements.

DETAILED DESCRIPTION

Figure 1:
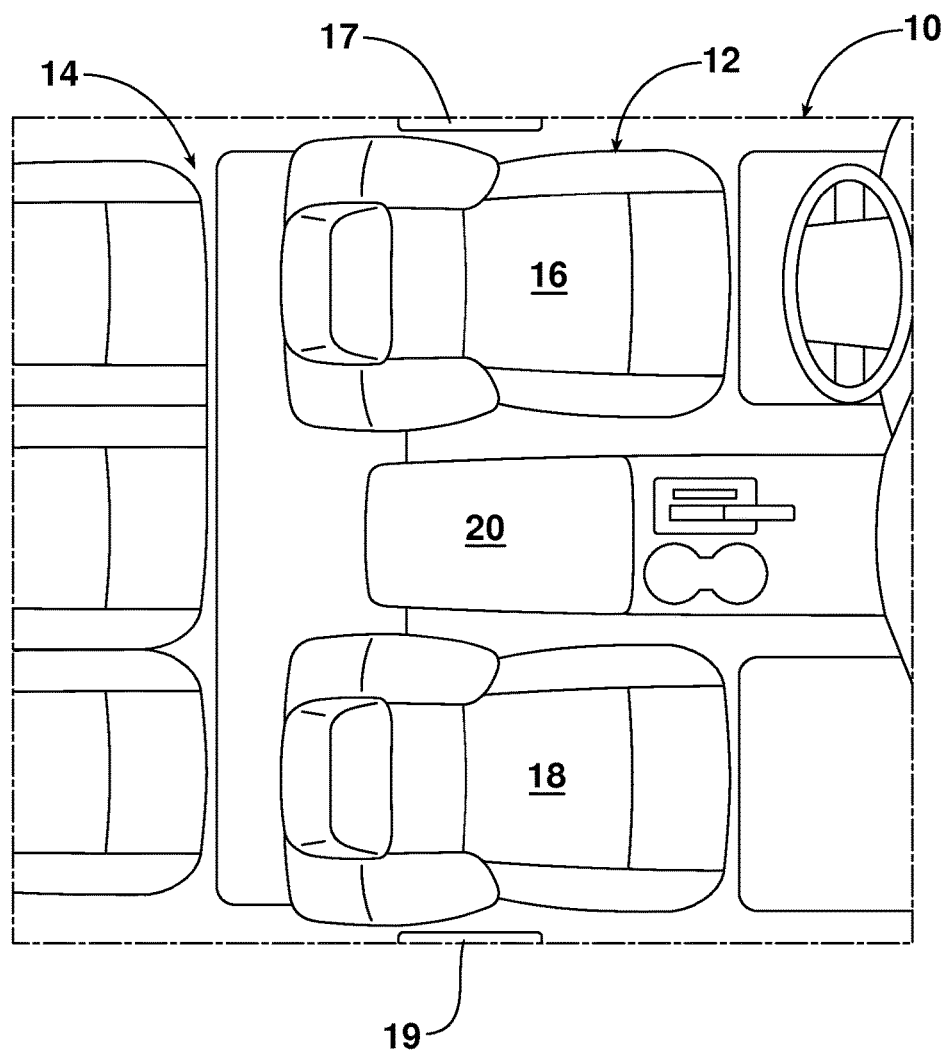
FIG. 1 is a partial top plan view of a typical vehicle having a front row of seats including two reclining seat assemblies.

Reference is now made to FIG. 1 which illustrates a vehicle 10 having a front row of seats 12 within a passenger compartment 14. The front row of seats 12 includes a driver seat 16 and a passenger seat 18. The driver seat 16 is positioned adjacent a side of the vehicle represented by a B pillar 17. Similarly, the passenger seat 18 is positioned adjacent a side of the vehicle represented by a B pillar 19. A center console 20 is positioned between the driver seat 16 and the passenger seat 18. Both of the driver seat and the passenger seat are typical reclining vehicle seat assemblies.

Figure 2:
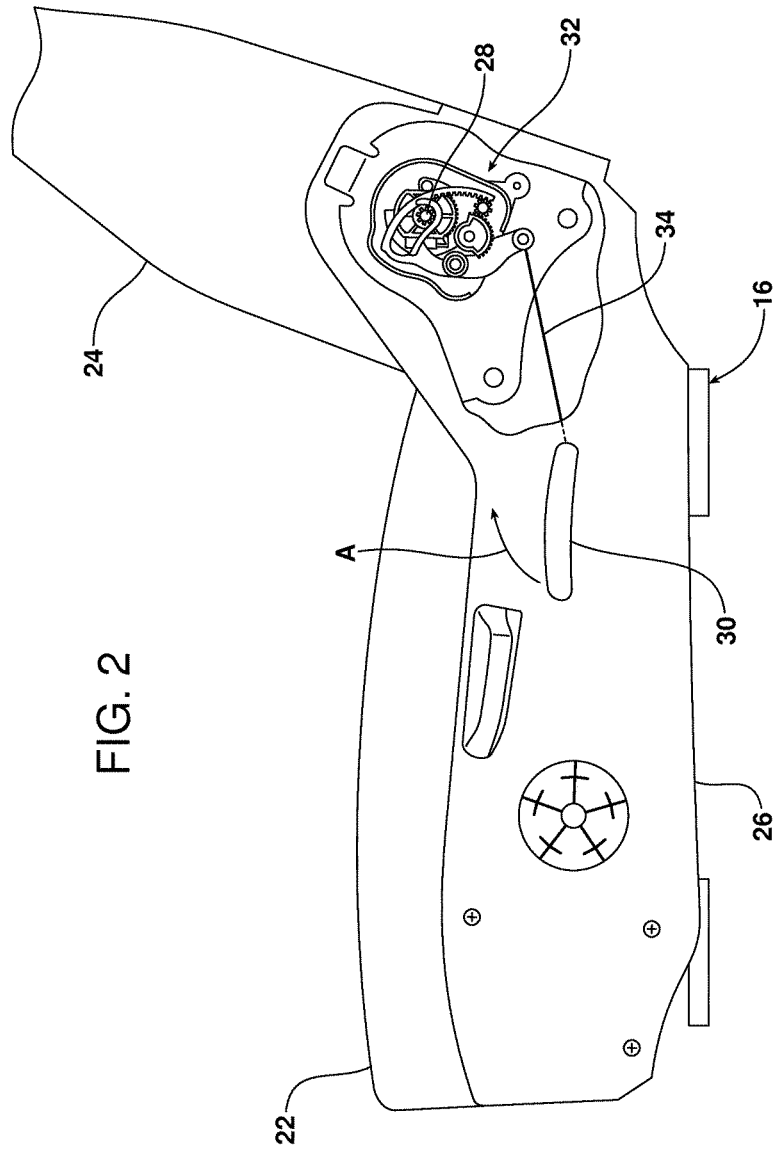
FIG. 2 is a side plan view of a portion of a vehicle seat assembly having a portion of a side shield cutaway revealing a transmission and wire connecting the transmission to an activation mechanism positioned outside of the side shield.

As shown in FIG. 2, the driver seat assembly 16 includes a seat base 22, a seat back 24, and a side shield 26. The seat back 24 rotates about a seat back recliner shaft 28 in response to an occupant's actions. An activation mechanism 30, shown as a lever or handle in the described embodiment, is connected to a manual gear transmission 32 via a wire 34. The activation mechanism 30 can take any structural form sufficient to be grasped by an occupant and moved such that a pulling force is created on the wire 34. Movement of the activation mechanism 30 (shown by action arrow A in FIG. 2) by the occupant pulls the wire 34 forward (shown by action arrow E in FIG. 4) and consequently activates the manual gear transmission 32 (hereinafter "transmission 32") and rotates the seat back recliner shaft 28.

Rotating the seat back recliner shaft 28 momentarily releases the seat back 24, which is biased for forward rotation in the described embodiment, for rotation in either forward or rearward directions. Releasing the activation mechanism 30 returns the seat back recliner shaft 28 to its original or resting, i.e., locked, position thereby locking the seat back 24 in a desired position. In the described embodiment, the activation mechanism 30 can accommodate a maximum load applied by an occupant of the seat assembly 16 of twenty-five newtons. Movement of the activation mechanism 30 creates a maximum torque of eight newton-meters in the described embodiment.

In FIG. 2, the side shield 26 is shown having a portion thereof cutaway to reveal the transmission 32 and the wire 34 which are positioned behind or beneath the side shield 26. In other words, the transmission 32 and the wire 34 are out of sight. The activation mechanism 30 (hereinafter "lever 30") is positioned outside of the side shield 16 in a location that is readily accessible to the occupant of the seat assembly 16 and avoids interference with a seat belt or a side pillar (not shown) of the vehicle 10. More specifically, the location of the lever 30 is in a zone relative a passenger hip point or H-point 31. In the described embodiment, the lever 30 is located in a zone which provides an optimal position for the lever 30 such that it is easy to locate and easy to utilize by the occupant. In alternate embodiments, the lever 30 may be located in any of several zones relative the H-point.

Figure 3:
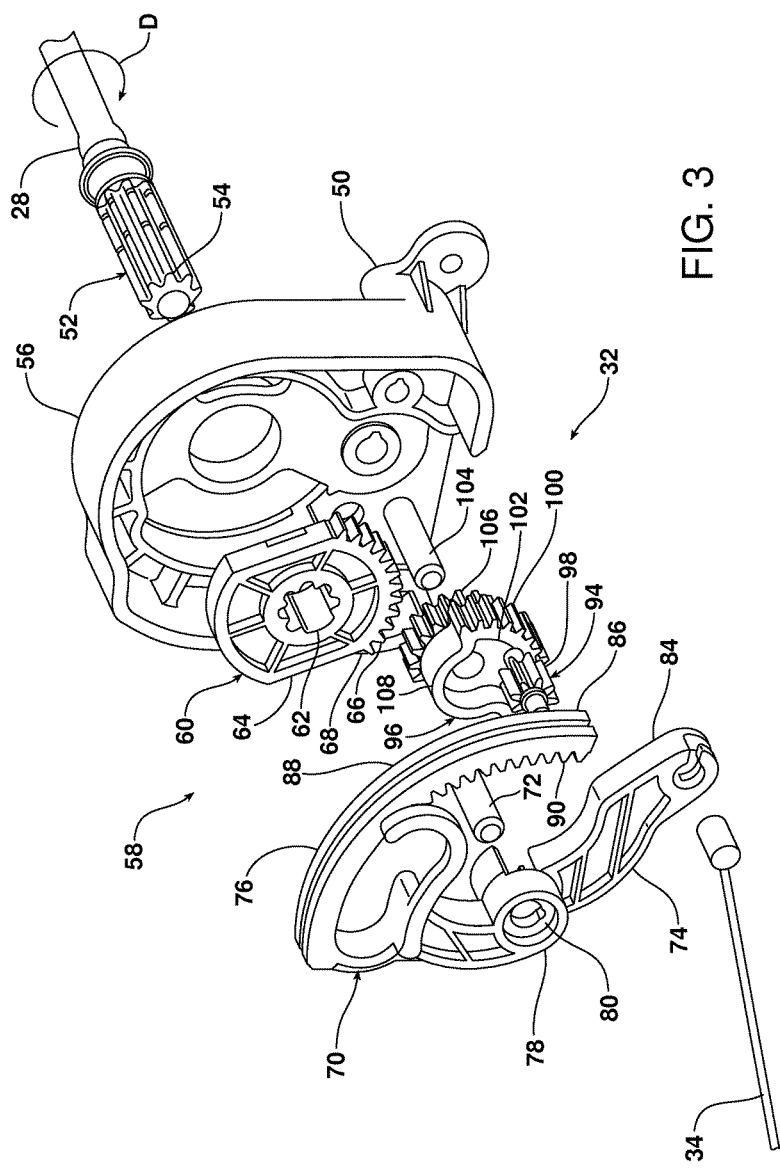
FIG. 3 is an exploded view of the transmission and seat back recliner shaft.

As best shown in FIG. 3, the transmission 32 is mounted in a housing 50. In the described embodiment, the housing 50 is supported by the seat base 22 as best shown in FIG. 2. At least a portion 52 of the seat belt recliner shaft 28 includes a plurality of radially extending teeth 54. The portion 52 of the seat back recliner shaft 28, including the plurality of teeth 54, extends through a back side 56 of the housing 50 and meshes with a plurality of gears, generally designed 58. Together, the plurality of gears 58 transmit torque created by movement of the lever 30 through the gears to the seat back recliner shaft 28. In the described embodiment, each of the plurality of gears 58 is a spur gear.

More specifically, the plurality of gears 58 include four interworking gears in the described embodiment. A first gear 60 is a sector gear having a central aperture 62 formed for receiving and meshing with the plurality of teeth 54 of the recliner shaft 28. Although shown along an end portion 52 of the recliner shaft 28 in the described embodiment, the plurality of teeth 54 may extend a full length of the seat back recliner shaft 18 or over only a portion or portions thereof. The first gear 60 is generally oval in shape having straight sides 64 and curved ends. A plurality of teeth 66 extend radially along one end 68 of the first gear 60.

A second gear 70 of the plurality of gears 58 is supported for rotation about a pin 72 extending from and supported by the housing 50. The second gear 70 includes a first arm 74 and a second arm 76 extending from a hub 78. The hub 78 includes an aperture 80 which receives at least a portion of the pin 72 forming an axis of rotation for the second gear 70. The first arm 74 is attached to the wire 34 adjacent a distal end 84 of the first arm. The second gear 70 is attached to the wire 34 such that movement of lever 30 pulls the wire and, in turn, the first arm 84 rotating the second gear in a clockwise direction about the pin 72. A distal end 86 of the second arm 76 forms an arc 88 having a plurality of teeth 90 along an inner side 92 thereof.

A third gear 94 and a fourth gear 96 transmit the torque created by movement of the lever 30 from the second gear 70 to the first gear 60 and the seat back recliner shaft 28. In the described embodiment, the third gear 94 is a pinion gear that is self-supported by the housing 50. A plurality of teeth 98 extend radially from the third gear 94 and mesh with the plurality of teeth 90 of the second arm 76 of the second gear 70 and a first plurality of teeth 100 extending radially from the fourth gear 96. Rotation of the second gear 70 about pin 72 creates clockwise rotation of the third gear 94 which creates a counterclockwise rotation in the fourth gear 96.

More specifically, the first plurality of teeth 100 of the fourth gear 96 are positioned along an extended sector or arc 102 formed generally around a portion, i.e., a forward portion as shown in FIG. 3, of the fourth gear 96. A central aperture of the fourth gear 96 receives at least a portion of a pin 104 forming an axis of rotation for the fourth gear. A second plurality of teeth 106 extend radially from a rearward sector or arc 108 of the fourth gear 96. The second plurality of teeth 106 mesh with the plurality of teeth 66 of the first gear 60 creating a clockwise rotation of the first gear 60.

Figure 4:
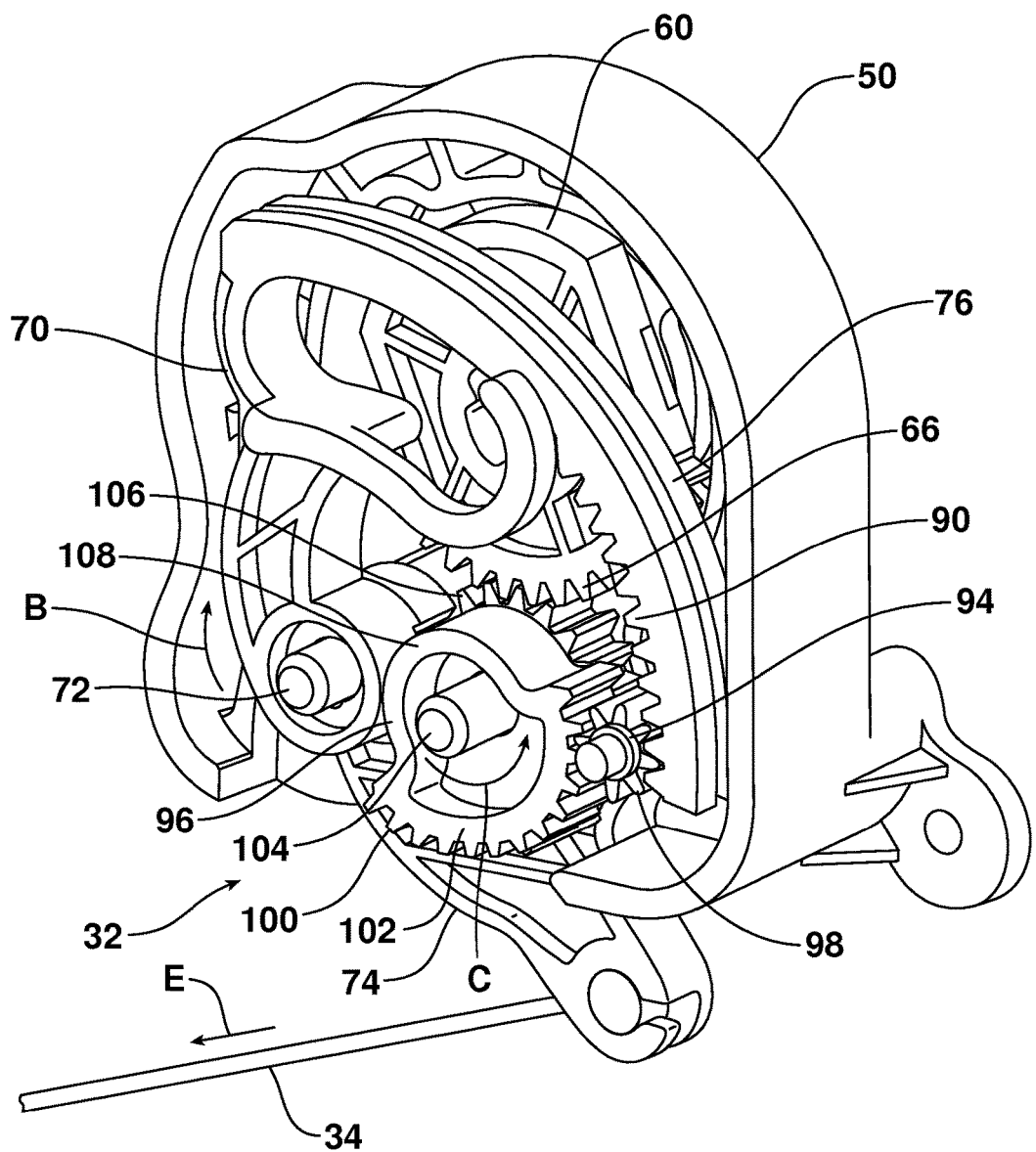
FIG. 4 is an isometric view of the transmission and seat back recliner shaft.

As shown in FIG. 4 and generally described above, activation of the lever 30 pulls the wire 34 away from the transmission 32, as shown by action arrow E, and toward the lever. Even more, the first arm 74 of the second gear 70 is likewise pulled toward the lever 30 rotating the second gear clockwise about the pin 72 as shown by action arrow B. Rotation of the second gear 70 necessarily rotates the second arm 76 in a clockwise direction. The plurality of teeth 90 extending from the inner side of the second arm 76 likewise rotate in a clockwise direction and mesh with the plurality of teeth 98 of the third gear 94.

Movement of the second gear 70 causes the third gear 94 to also rotate in a clockwise direction. The teeth 94 of the third gear 94 mesh with the first plurality of teeth 100 of the fourth gear 96 causing the fourth gear to rotate counterclockwise as shown by action arrow C. As the fourth gear 96 rotates, a second plurality of teeth 106 of the fourth gear mesh with the plurality of teeth 66 of the first gear 60 causing the first gear and the seat back recline shaft 28 to both rotated clockwise. This rotation is represented by action arrow D in FIG. 3.

In summary, numerous benefits result from the utilization of the release mechanism for a reclining seat assembly of a vehicle as illustrated in this document. Utilizing the transmission 32 to transfer movement of the lever 30 via the wire 34 to the seat back recline shaft 28 in order to release the seat back allows the lever 30 to be positioned in essentially any location along the side shield 26. Accordingly, the lever 30 can be positioned such that the lever is both easy to locate and easy to utilize.

In the described embodiment, the lever 30 is positioned in a zone relative the H-point 31 wherein the lever is considered to be easy to locate and utilize. In this position, the lever 30 avoids interference with the seat belt and the sides or B pillars 17, 19 of the vehicle 10. Even more, the wire 34 and transmission 32 are positioned behind the seat side shield 26 thereby minimizing an amount of space between the seat side shield 26 and the vehicle sides and B pillars 17, 19 required to package the parts utilized to recline the seat back 24.

The foregoing has been presented for purposes of illustration and description. It is not intended to be exhaustive or to limit the embodiments to the precise form disclosed. Obvious modifications and variations are possible in light of the above teachings. For example, the lever may be positioned in one of several acceptable zones relative the H-point. All such modifications and variations are within the scope of the appended claims when interpreted in accordance with the breadth to which they are fairly, legally and equitably entitled.

What is claimed:

1. A release mechanism for a reclining vehicle seat assembly having a seat base, a seat back, a side shield and a seat back recliner shaft about which said seat back rotates, comprising:
   an activation mechanism; and
   a transmission coupled to said activation mechanism via a wire for rotating the seat back recliner shaft and releasing the seat back;
   wherein the transmission comprises a first gear having internal teeth configured to engage a back recliner shaft, a second gear having a first arm connected to the wire and a second arm with a plurality of teeth disposed on a concave edge of the second arm, and one or more intermediate gears interconnecting the plurality of teeth on the second arm with the internal teeth of the first gear.

2. The release mechanism for a reclining vehicle seat of claim 1, wherein said wire and said transmission are positioned within said seat assembly.

3. The release mechanism for a reclining vehicle seat assembly of claim 1, wherein said transmission includes a housing, supported by said seat base, through which said seat back recliner shaft extends, and a plurality of gears, including said first gear, said second gear, and said one or more intermediate gears.

4. The release mechanism for a reclining vehicle seat assembly of claim 3, wherein at least a portion of said seat back recliner shaft includes a plurality of teeth, and said plurality of gears includes a first gear having a central aperture and internal teeth for receiving said seat back recliner shaft and meshing with said plurality of teeth.

5. The release mechanism for a reclining vehicle seat assembly of claim 4, wherein said plurality of gears further includes said second gear attached to said wire such that movement of said activation mechanism moves said wire thereby rotating said second gear about a pin extending from said housing and supporting said second gear.

6. The release mechanism for a reclining vehicle seat assembly of claim 5, wherein said second gear includes said first and second arms extending from a hub, wherein said first arm is attached to said wire adjacent a distal end of said first arm, and said second arm includes a distal end forming an arc having said plurality of teeth on an inner side of said arc.

7. The release mechanism for a reclining vehicle seat assembly of claim 6, wherein said one or more intermediate gears comprises third and fourth gears for transmitting torque created by movement of said activation mechanism from said second gear to said first gear and said seat back recliner shaft.

8. The release mechanism for a reclining vehicle seat assembly of claim 7, wherein said third and fourth gears each have a plurality of teeth, and said plurality of teeth of said third gear mesh with said plurality of teeth of said second gear and said plurality of teeth of said fourth gear, and said plurality of teeth of said fourth gear further mesh with a plurality of external teeth on said first gear.

9. A vehicle incorporating the release mechanism for a reclining vehicle seat assembly of claim 1.

10. The release mechanism for a reclining vehicle seat of claim 3, wherein said wire and said transmission are positioned within said seat assembly.

11. The release mechanism for a reclining vehicle seat assembly of claim 3, wherein said activation mechanism is a lever and said plurality of gears are meshed for transmitting torque created by movement of said lever from the second gear of said plurality of meshed gears attached to said wire to said seat back recliner shaft.

12. The release mechanism for a reclining vehicle seat assembly of claim 11, wherein said second gear of said plurality of meshed gears includes said first and second arms extending from a hub, said first arm moved by said wire and said second arm forming an arc having said plurality of teeth on an inner side of said arc for meshing with another one of said plurality of meshed gears.

13. The reclining vehicle seat assembly of claim 3, wherein at least a portion of said seat back recliner shaft includes a plurality of teeth, and said plurality of gears includes said first gear having said internal teeth for meshing with said plurality of teeth of said seat back recliner shaft, and said second gear attached to said wire such that movement of said lever moves said wire thereby rotating said second gear about a pin extending from said housing and supporting said second gear.

14. The reclining vehicle seat assembly of claim 13, wherein said second gear includes said first and second arms extending from a hub, said first arm attached to said wire and said second arm forming an arc having said plurality of teeth on an inner side of said arc.

15. The reclining vehicle seat assembly of claim 13, wherein said one or more intermediate gears comprises third and fourth gears for transmitting torque created by movement of said lever from said second gear to said first gear and said seat back recliner shaft.

16. The reclining vehicle seat assembly of claim 15, wherein said third and fourth gears each have a plurality of teeth, and said plurality of teeth of said third gear mesh with said plurality of teeth of said second gear and said plurality of teeth of said fourth gear, and said plurality of teeth of said fourth gear further mesh with a plurality of external teeth on said first gear.

* * * * *